(12) United States Patent
Kozawa et al.

(10) Patent No.: US 11,558,694 B2
(45) Date of Patent: Jan. 17, 2023

(54) ELECTRET

(71) Applicants: DENSO CORPORATION, Kariya (JP); TOKYO UNIVERSITY OF SCIENCE FOUNDATION, Tokyo (JP)

(72) Inventors: Yoshihiro Kozawa, Kariya (JP); Noriyuki Matsushita, Kariya (JP); Kazuhiko Kanoh, Kariya (JP); Yumi Tanaka, Tokyo (JP); Tomoya Maruyama, Tokyo (JP); Hiroshi Okamoto, Kariya (JP); Naoya Morioka, Kariya (JP); Katsuyoshi Saiki, Kariya (JP)

(73) Assignees: DENSO CORPORATION, Kariya (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 146 days.

(21) Appl. No.: 17/116,217

(22) Filed: Dec. 9, 2020

(65) Prior Publication Data

US 2021/0185451 A1    Jun. 17, 2021

(30) Foreign Application Priority Data

Dec. 13, 2019  (JP) .............................. JP2019-225737
Sep. 30, 2020  (JP) .............................. JP2020-164899

(51) Int. Cl.
*H04R 19/01* (2006.01)
*C04B 35/50* (2006.01)
(Continued)

(52) U.S. Cl.
CPC ............. *H04R 19/01* (2013.01); *C04B 35/50* (2013.01); *H01G 7/025* (2013.01); *H04R 19/005* (2013.01)

(58) Field of Classification Search
CPC ...... H04R 19/01; H04R 19/005; H01G 7/025; H01G 7/026; C04B 35/50; C04B 35/4682
See application file for complete search history.

(56) References Cited

U.S. PATENT DOCUMENTS

2021/0183584 A1*  6/2021  Matsushita ............. C01B 25/32
2021/0184100 A1*  6/2021  Matsushita ........... H01L 41/113

FOREIGN PATENT DOCUMENTS

| CN | 109817838 A | 5/2019 |
| JP | 6465377 B2 | 2/2019 |
| WO | 2012/073465 A1 | 6/2012 |

OTHER PUBLICATIONS

M. Fabian et al., 'Ionic and electronic transport in calcium-substituted LaAlO3 perovskites prepared via mechanochemical route,' Journal of the European Ceramic 2019 39(16), 5298-5308 (Jul. 31, 2019).

(Continued)

*Primary Examiner* — Karl E Group
(74) *Attorney, Agent, or Firm* — Posz Law Group, PLC

(57) ABSTRACT

An electret includes a composite oxide having an $ABO_3$ type perovskite structure containing two different metal elements A and B. The composite oxide is in a polarized state, at least a part of one of the metal elements A and B is substituted with a dopant element having a lower valence than the one of the metal elements A and B, and the composite oxide has a bandgap energy of 4 eV or more.

7 Claims, 2 Drawing Sheets

(51) Int. Cl.
  *C04B 35/44* (2006.01)
  *H04R 19/00* (2006.01)
  *H01G 7/02* (2006.01)

(56) References Cited

OTHER PUBLICATIONS

S. Lisitsina et al., 'The role of structural point defects in the type formation of electret state in perovskite-type oxides,' Journal of Electrostatics V 24(3), 295-300 (Mar. 31, 1990).
Gao, Wenxiu & Zhu, Yi & Wang, Yaojin & Yuan, Guoliang & Liu, Jun-Ming. (2019). A review of flexible perovskite oxide ferroelectric films and their application. Journal of Materiomics. 6. 10.1016/j.jmat.2019.11.001.

* cited by examiner

ELECTRET

CROSS REFERENCE TO RELATED APPLICATIONS

The present application claims the benefit of priority from Japanese Patent Application No. 2019-225737 filed on Dec. 13, 2019 and Japanese Patent Application No. 2020-164899 filed on Sep. 30, 2020. The entire disclosures of all of the above applications are incorporated herein by reference.

TECHNICAL FIELD

The present disclosure relates to an electret.

BACKGROUND

As an energy harvesting technology that converts energy existing in the environment into electric power, practical application of a vibration power generation element or the like using an electret has been studied.

SUMMARY

An electret according to an aspect of the present disclosure includes a composite oxide having an $ABO_3$ type perovskite structure containing two different metal elements A and B, the composite oxide is in a polarized state, at least a part of one of the metal elements A and B is substituted with a dopant element having a lower valence than the one of the metal elements A and B, and the composite oxide has a bandgap energy of 4 eV or more.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
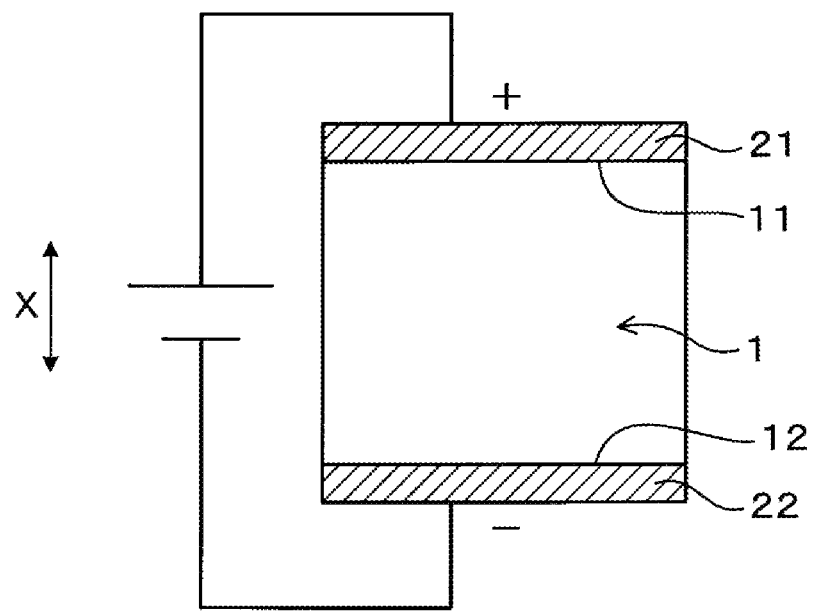
FIG. 1 is a schematic diagram for explaining a schematic configuration of an electret and a polarization method in a first embodiment.

As a constituent material of electrets, for example, an organic polymer material such as a fluororesin is generally used. While the organic polymer material has advantages such as shape freedom and excellent controllability of film thickness in thin film formation, there are concerns about a thermal stability of a surface potential and a deterioration of performance over time in a high temperature environment because of being an organic matter.

On the other hand, electrets may be formed using inorganic compound material so as to have excellent stability at high temperatures. For example, an electret material may be a sintered body having a crystal structure of hexagonal hydroxyapatite and having a hydroxide ion content lower than that of hydroxyapatite having a stoichiometric composition. This sintered body can be obtained by sintering and dehydrating a molded product made from hydroxyapatite powder at a high temperature of higher than 1250° C. and lower than 1500° C. and it is considered that a high surface potential is expressed after a polarization treatment due to defects of hydroxide ions.

In the above-described electret material, when hydroxyapatite is dehydrated at high temperatures, a part of the hydroxyapatite becomes oxyhydroxyapatite and crystal defects occur. In that case, although it is possible to adjust the amount of dehydration to some extent depending on the treatment conditions and the like, it is difficult to control the amount of dehydration accurately. It was also difficult to quantitatively evaluate the amount of defects in the device shape. Therefore, it is difficult to control the amount of defects generated in an apatite structure, and it is not always easy to obtain an electret having a desired surface potential.

An electret according to an aspect of the present disclosure includes a composite oxide having an $ABO_3$ type perovskite structure containing two different metal elements A and B, the composite oxide is in a polarized state, at least a part of one of the metal elements A and B is substituted with a dopant element having a lower valence than the one of the metal elements A and B, and the composite oxide has a bandgap energy of 4 eV or more.

The electret having the above configuration uses the $ABO_3$ type composite oxide, and oxygen defects are introduced by substituting the part of at least one of the metal elements with the lower valence dopant element. Therefore, by controlling the amount of substitution with the dopant element, it is possible to control the amount of defects that are presumed to contribute to the expression of the surface potential. Further, the composite oxide, which is an inorganic dielectric material, is thermally stable and has a high bandgap energy of 4 eV or more, so that an dielectric breakdown voltage during a polarization treatment can be increased. Therefore, a high surface potential can be obtained by applying a high voltage under heating conditions, and the electret has stable characteristics in a high temperature environment and long-term use.

As described above, according to the above aspect, it is possible to provide an electret having excellent thermal stability, controllable in the amount of crystal defects, and having stable characteristics in a usage environment.

First Embodiment

An electret according to a first embodiment will be described with reference to FIG. 1. As shown in FIG. 1, an electret 1 of the present embodiment includes a composite oxide having an $ABO_3$ type perovskite structure containing two different metal elements A and B, and the composite oxide is in a polarized state. In the composite oxide, at least one of the metal elements A and B is partially substituted with a dopant element having a lower valence than the metal elements A and B, and a bandgap energy is 4 eV or more. Preferably, a sintered body formed of the composite oxide into a predetermined shape is used.

The electret 1 is a charging substance that retains positive or negative charges on surfaces and provides an electrostatic field to the surroundings. The composite oxide, which is an inorganic dielectric material, is subjected to a later-described polarization treatment to express a surface potential. The electret 1 is used, for example, as an integrated circuit built-in power generation element in various devices that mutually convert mechanical energy and electrical energy, for example, in a small electrostatic vibration power generation device that uses environmental vibration as a power source.

The composite oxide constituting the electret 1 has a perovskite-type crystal structure represented by the composition formula $ABO_3$ as a basic structure, and typically has a cubic unit cell. The metal element A is located at each vertex of a cubic crystal, the metal element B is located at a center position of the cubic crystal, and an oxygen atom O is coordinated with respect to each of the metal elements A and B in a regular octahedron.

The dopant element is substituted for the metal element A or the metal element B, or both the metal elements A and B in the composition formula $ABO_3$. The combination of the metal elements A and B is not particularly limited as long as it is a composite oxide having a bandgap energy of 4 eV or more, and the dopant element may be any metal element having a valence lower than the valence of the metal elements A or B to be substituted. By substituting with a lower valence dopant element, crystal defects due to oxygen deficiency occur in the perovskite structure in order to maintain electrical neutrality, which contributes to the improvement of the surface potential.

At this time, since there is a correlation between the amount of substitution with the dopant element and the amount of defects, it is possible to control the amount of defects that affect the surface potential by controlling the introduced amount of the dopant element. Further, since the dielectric breakdown voltage of the composite oxide is increased by using an inorganic dielectric material having a relatively large bandgap energy of 4 eV or more, the electret 1 can express a desired high potential by being applied with a high voltage during the polarization treatment. It is more preferable to use an inorganic dielectric material having a bandgap energy of 4.5 eV or more, more preferably 5.5 eV or more.

In the perovskite structure, the combination of the metal element A occupying an A site and the metal element B occupying a B site is not particularly limited as long as the combination satisfies the composition formula $ABO_3$. In that case, for example, in addition to the combination of the trivalent metal element A and the trivalent metal element B, a combination of monovalent and pentavalent, and a combination of divalent and tetravalent can be used.

As a specific example, in the $ABO_3$ type perovskite structure, the A site may be occupied by a rare earth element R (metal element A) selected from La, Y, Pr, Sm and Nd, and the B site may be occupied by Al (metal element B). The rare earth aluminate in which these components are combined has a large bandgap energy of 4 eV or more and a relatively small relative permittivity (for example, 100 or less), so that a high surface potential can be realized. In addition, the rare earth aluminate can be manufactured using a relatively inexpensive material, which is advantageous in terms of manufacturing cost.

In this case, the dopant element substituted for the metal elements A and B may be a metal element having a lower valence than the trivalent metal elements A and B. For example, when the metal element A is a trivalent rare earth element R, a divalent alkaline earth metal element (including Mg) is preferably used, and Ca or Sr can be more preferably used. When the metal element B is trivalent Al, one or more elements selected from divalent alkaline earth metal elements (including Mg) and Zn, for example, Zn or Mg can be preferably used.

Specifically, lanthanum aluminate ($LaAlO_3$) can be mentioned as a typical example of the rare earth aluminate, and a structure in which a part of La is substituted with an alkaline earth metal element (for example, Ca) can be used. In that case, it can be represented by the composition formula $(La, Ca)AlO_{3-\delta}$, in which $\delta$ represents the amount of oxygen defects. The amount of oxygen defects varies depending on the amount of substitution by the dopant element, the atmosphere, and the like. When a substitution ratio by the dopant element is x (atomic %), if the oxygen defect is due to substitution, the composition formula is $La_{(1-x)}Ca_x AlO_{3-x/2}$. 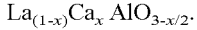

The substitution ratio of the dopant element that substitutes for the metal element A can be appropriately set in the range of, for example, 20 atomic % or less. Similarly, the substitution ratio of the dopant element that substitutes for the metal element B is preferably in the range of, for example, 20 atomic % or less. When the substitution ratio exceeds 0, the effect of improving the surface potential can be obtained as compared with the case where the dopant element is not introduced. Preferably, when the substitution ratio is 0.05 atomic % or more, the surface potential is greatly improved. However, when the substitution ratio increases, the effect of introducing the dopant element tends to decrease. The reason for this is not entirely clear, but it is presumed that an increase in the relative permittivity acts to lower the surface potential. Therefore, it is preferable to appropriately set the substitution ratio within the range where the substitution ratio does not exceed 20 atomic % so that the desired characteristics can be obtained. The substitution ratio is preferably in the range of 0.05 atomic % to 18.8 atomic %, and more preferably in the range of 0.05 atomic % to 2.5 atomic %.

The electret 1 can be obtained, for example, by subjecting the composite oxide having such a perovskite structure to the polarization treatment so as to be a sintered body having a predetermined shape (hereinafter, referred to as a composite oxide sintered body). The composite oxide sintered body to be the electret 1 can have an arbitrary outer shape (for example, a rectangular flat plate shape or a disk shape). Here, a vertical direction in the drawing is referred to as a thickness direction X of the electret 1, and hereinafter, a surface in the thickness direction X will be described as an upper surface or a lower surface.

The polarization treatment method is not particularly limited, but for example, as shown in FIG. 1, electrodes 21 and 22 are formed on an upper surface 11 and a lower surface 12 of the electret 1, respectively, and a voltage is applied. As for the polarization treatment conditions, it is desirable to apply a direct-current voltage so that the electric field strength becomes 4 kV/mm or more at 100° C. or higher, for example. In order to realize efficient power generation for devices such as vibration power generation, a surface potential of 400 V or more is required, and it is possible to realize a desired surface potential by a polarization treatment with an electric field strength of 4 kV/mm or more. In addition, by performing the polarization treatment at a temperature higher than room temperature, stable electret performance can be realized even in applications where the usage environment is at high temperatures.

EXAMPLES

Example 1

The electret 1 having the configuration shown in FIG. 1 was produced by the following method. As the inorganic dielectric material constituting the electret 1, a LAO-based composite oxide having a composition in which a part of La in lanthanum aluminate ($LaAlO_3$) having a perovskite structure was substituted with a dopant element was used. In Example 1, a composite oxide sintered body obtained by using Ca as a dopant element and preparing a raw material so as to have a composition of $(La_{0.9995}, Ca_{0.0005})AlO_{3-\delta}$ was polarized to be the electret 1.

Lanthanum aluminate ($LaAlO_3$), which is a typical composition of the LAO-based inorganic dielectric material, has a bandgap energy of 5.6 eV, and even a configuration in which a part of Al is substituted with Ca, which is a dopant element, has almost the same bandgap energy.

<Preparation of Powder>

First, as a raw material for the LAO-based composite oxide sintered body, the following nitrate reagents were prepared and weighed so that the amount of substitution with Ca was 0.05 atomic %. 20 ml of ultrapure water was added to a beaker containing each reagent to obtain a solution in which each reagent was dissolved.

$La(NO_3)_3 \cdot 6H_2O$ 6.03 g manufactured by FUJIFILM Wako Pure Chemical Corporation $Al(NO_3)_3 \cdot 9H_2O$ 5.25 g manufactured by FUJIFILM Wako Pure Chemical Corporation $Ca(NO_3)_2 \cdot 4H_2O$ 1.65 mg manufactured by FUJIFILM Wako Pure Chemical Corporation The obtained solution of each reagent was transferred to a plastic beaker and was stirred and mixed using a stirrer. The stirring was performed by placing the stirrer in the plastic beaker and rotating the stirrer at 500 rpm. To the beaker containing this mixed solution, an aqueous NaOH solution having a molar concentration of 12 M was added little by little using a dropper while measuring with a pH meter to adjust the pH to 10.5. Then, a precipitate was collected by filtration under reduced pressure and washed with about 100 ml of ethanol and ultrapure water. The following reagents were used for NaOH for the NaOH aqueous solution and ethanol.

NaOH special grade (granular) manufactured by Kanto Chemical Co., Inc.

Ethanol (99.5) manufactured by Kanto Chemical Co., Inc.

Next, a filter paper on which the washed sample was placed was placed in a dryer at 120° C., and was dried for 12 hours or more. The dried sample was placed in an agate mortar and crushed, and was further classified (<100 μm).

<Producing of Molded Body/Sintered Body>

The powder obtained by classification was placed in an alumina boat and calcined. As calcination conditions, the temperature was raised to 1000° C. at a temperature rising rate of 2.5° C./min, held at 1000° C. for 6 hours, and then lowered to room temperature at a temperature lowering rate of 2.5° C./min.

The sample after calcining was placed in an agate mortar and crushed, and was further classified (<100 μm) to obtain a molding powder. About 0.65 g of the molding powder was placed in a pellet molding unit having a diameter of ϕ13 mm and pressed at a pressure of 250 MPa for 3 minutes to form a disk-shaped pellet.

The obtained molded pellet was sintered at a temperature higher than the sintering temperature to obtain a sintered pellet made of the LAO-based composite oxide sintered body. As sintering conditions, the temperature was raised to 1650° C. at a temperature rising rate of 2.5° C./min, held at 1650° C. for 2 hours, and then lowered to room temperature at a temperature lowering rate of 2.5° C./min. The diameter of the obtained sintered pellet was about 011 mm. The thickness was adjusted to 1 mm by polishing.

Further, the obtained LAO-based composite oxide sintered body was subjected to elemental analysis using ICP emission spectroscopy, and it was confirmed that a sintered body having the desired composition $(La_{0.9995}, Ca_{0.0005})AlO_{3-\delta}$ could be obtained. Specifically, a solution obtained by dissolving the sintered body crushed in a mortar in a solvent was used as an analysis sample, and constituent elements of the sintered body were discriminated from emission lines generated by ICP (high frequency inductively coupled plasma). As a result, as shown below, almost the same analysis result (0.051 atomic %) was obtained with respect to 0.05 atomic %, which is the Ca substitution ratio at the time of raw material preparation (charged Ca substitution amount).

(Charged Ca substitution amount 0.05 atomic %)

ICP analysis result 0.051 atomic %

The analysis of the LAO-based composite oxide sintered body is not limited to the ICP emission spectroscopic analysis method, and any method such as XPS (X-ray photoelectron spectroscopic analysis) method and XRF (fluorescent X-ray analysis) method may be adopted. By introducing the dopant element in this way, the substitution amount can be easily controlled and the quantitative evaluation can be easily performed.

<Polarization Treatment>

Figure 2:
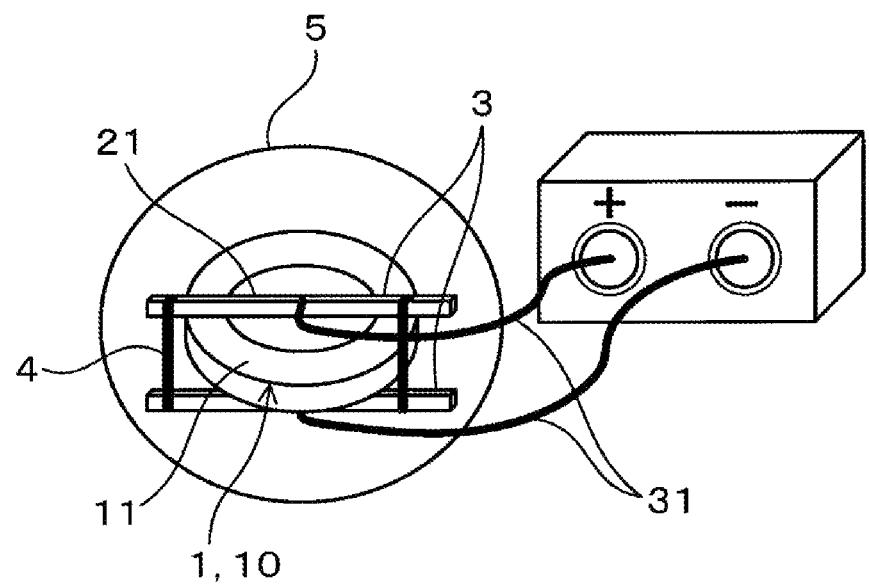
FIG. 2 is a schematic diagram for explaining a specific example of an electret polarization method according to an example.

The sintered pellet obtained as described above was subjected to the polarization treatment using a polarization treatment apparatus shown in FIG. 2. In FIG. 2, in the sintered pellet 10, a pair of gold electrodes 21 and 22 were printed in advance on the upper and lower surfaces 11 and 12 in the thickness direction X (the gold electrode 22 on the lower surface 12 is not shown). The sintered pellet 10 was sandwiched between two alumina rods 3 around which a platinum wire 31 was wound, so that a voltage could be applied between the pair of gold electrodes 21 and 22. The two alumina rods 3 were longer than the diameter of the sintered pellet 10 and were fixed by being tied with threads 4 made of fluororesin (polytetrafluoroethylene) at both ends in the length direction (direction orthogonal to the thickness direction X). Next, this was wrapped around a polarization instrument, and the whole was coated with silicone oil 5 in order to prevent dielectric breakdown of air.

This polarization instrument was placed in a box furnace and left until the temperature inside the furnace became stable at 200° C. Next, while being stabilized at 200° C., polarization was performed by applying a direct-current electric field of 8.0 kV/mm between the pair of gold electrodes 21 of the sintered pellet 10. After the lapse of a predetermined time, the sintered pellet 10 was allowed to cool until the temperature became 40° C. or lower while the direct-current electric field was continuously applied.

<Making an Electret>

After the polarization treatment, the gold electrodes 21 and 22 on both surfaces of the sintered pellet 10 were removed using a polishing sheet. Next, the sintered pellet 10 was ultrasonically washed with ethanol and pure water for 10 minutes each, and was further left in a dryer at 100° C. for 3 hours or more to obtain the electret 1.

<Surface Potential Measurement>

The surface potential of the electret 1 (Example 1) obtained as described above was measured. For the measurement, a surface potential meter (MODEL341-B: manufactured by Trek Japan Co., Ltd.) was used to measure the surface potential without contact, and the value after 5400 seconds had passed was read. The results are shown in Table 1.

TABLE 1

| Example/Comparative Example | Ca Substitution Amount (atomic %) | Surface Potential (V) |
|---|---|---|
| Example 1 | 0.05 | 438 |
| Comparative Example 1 | — | 20 |
| Comparative Example 2 | — | 4 |

Comparative Examples 1 and 2

For comparison, a commercially available LaAlO$_3$(100) single crystal substrate (manufactured by Crystal Base Co., Ltd.) was used as a LaAlO$_3$ sintered body in which La was not substituted, and polarization treatment was performed in the same manner as in Example 1 to obtain an electret of Comparative Example 1. Further, a sintered body of barium titanate (BaTiO$_3$), which is a composite oxide having a perovskite structure and a bandgap energy of 3.5 eV, was prepared and was subjected to the polarization treatment in the same manner as in Example 1 to obtain an electret of Comparative Example 2.

Here, in the BaTiO$_3$ sintered body of Comparative Example 2, the following reagent was used as a raw material for molding.

Barium titanate nanopowder (purity 99%, manufactured by FUJIFILM Wako Pure Chemical Corporation)

This raw material for molding was placed in a pellet molding unit having a diameter of 13 mm and pressurized at a pressure of 250 MPa for 3 minutes in the same manner as in Example 1 above, and the obtained molding pellet was sintered to obtain a sintered pellet. The sintering conditions were a temperature rising rate and a temperature lowering rate of 2.5° C./min, and sintering was performed at 1255° C. for 0.5 hours.

The surface potentials of the electrets of Comparative Examples 1 and 2 were measured in the same manner as in Example 1, and the results are also shown in Table 1. As is clear from Table 1, in Example 1 in which a part of La of LaAlO$_3$ was substituted with Ca, the surface potential was 438 V, and a high surface potential of 400 V or more was obtained by application of a direct-current electric potential of 8.0 kV/mm. On the other hand, in Comparative Example 1, which was composed of a single crystal of LaAlO$_3$ and was not substituted with a dopant element, the surface potential was significantly reduced to 20 V. Further, in Comparative Example 2 using BaTiO$_3$ having a bandgap energy of less than 4 eV, the surface potential was further lowered to 4 V.

Examples 2 to 5

In the composition of La$_{(1-x)}$Ca$_x$AlO$_{3-\delta}$, the substitution ratio (x) of La with the dopant element (Ca) was changed by the same method as in Example 1, raw materials were prepared so as to have compositions in the range of 1 atomic % to 20 atomic % (charged Ca substitution amount), and electrets 1 composed of LAO-based composite oxide sintered bodies were prepared.

Example 2 1 atomic %
Example 3 5 atomic %
Example 4 10 atomic %
Example 5 20 atomic %

Molded pellets were prepared using raw materials prepared so that the substitution ratio (x) of La with the dopant element (Ca) was in the range of 1 atomic % to 20 atomic %, and sintered pellets obtained by sintering the molded pellets were subjected to the polarization treatment to obtain the electrets 1. As shown as Examples 2 to 5 in Table 2, the obtained LAO-based composite oxide sintered bodies were subjected to elemental analysis using ICP emission spectroscopic analysis, and the compositions were confirmed. As a result, the actual substitution ratios were in the range of 0.16 atomic % to 0.93 atomic %, which were ⅕ or less of the Ca substitution ratio (charged Ca substitution amount) at the time of raw material preparation.

The surface potentials of the obtained electrets 1 of Examples 2 to 5 were measured in the same manner as in Example 1, and the results are also shown in Table 2. It is not entirely clear why the electrets 1 of Examples 2 to 5 are not sufficiently incorporated with Ca at the time of raw material preparation by the same production method (liquid phase method) as in Example 1, but the electret 1 having a desired substitution ratio can be obtained by knowing a relationship between the charged Ca substitution amount and the actual substitution amount in advance.

TABLE 2

| Example | Ca Substitution Amount (atomic %) | Surface Potential (V) |
|---|---|---|
| Example 2 | 0.16 | 3688 |
| Example 3 | 0.3 | 2155 |
| Example 4 | 0.5 | 1400 |
| Example 5 | 0.93 | 3433 |

As is clear from Table 2, in Examples 2 to 5, the surface potentials are higher than the surface potential in Example 1, and the surface potentials of 1400 V (Example 4) to 3688 V (Example 2), which are higher than 1000 V, were obtained. It is presumed that this is because, with respect to LaAlO$_3$ having the perovskite structure, the substitution with the lower valence dopant element causes oxygen defects according to the amount of substitution, which contributes to the expression of the high surface potentials.

Figure 3:
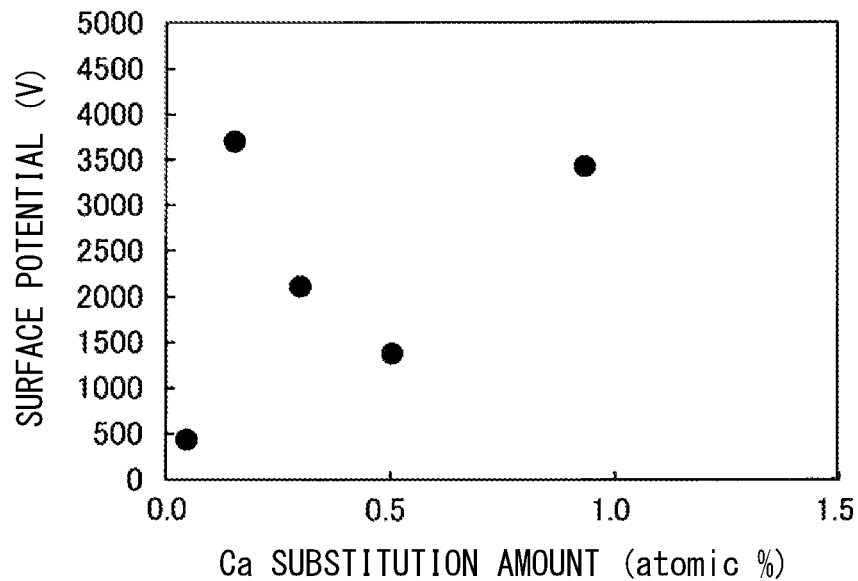
FIG. 3 is a diagram showing a relationship between the Ca substitution amount and the surface potential in examples.
Figure 4:
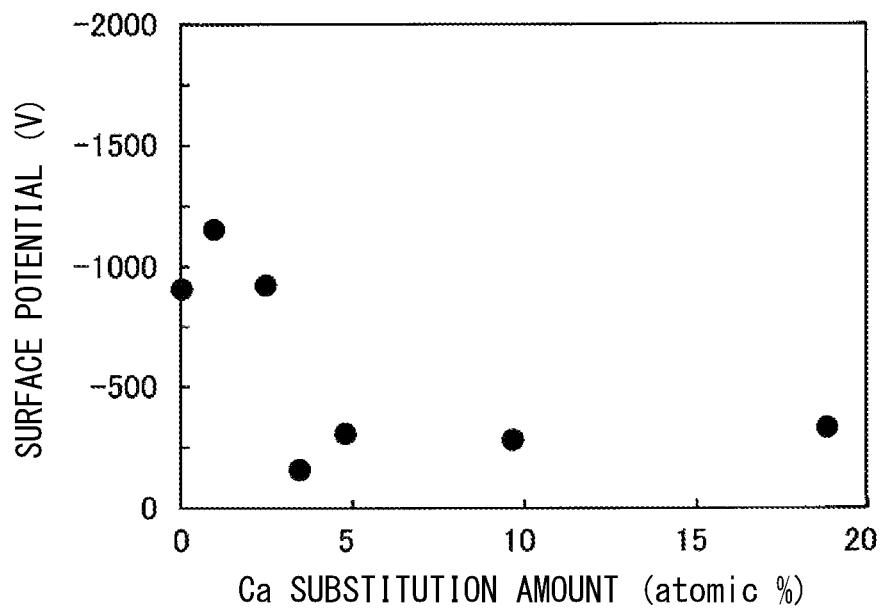
FIG. 4 is a diagram showing a relationship between the Ca substitution amount and the surface potential in examples.

FIG. 3 shows the relationship between the Ca substitution amount and the surface potential based on Comparative Example 1 and Examples 1 to 5, and a high surface potential is expressed when the Ca substitution amount is 0.05 atomic % or more. When the Ca substitution amount increases to 0.16 atomic % or more, the surface potential further increases significantly.

Examples 6 to 12

As an inorganic dielectric material constituting electrets 1, a YAO-based composite oxide having a composition in which a part of Y in yttrium aluminate (YALO$_3$) was substituted with a dopant element was used. The dopant element was Ca, and in the composition of Y$_{(1-x)}$Ca$_x$AlO$_{3-\delta}$, the substitution ratio (x) of Y with Ca was changed to prepare the electrets 1 made of the YAO-based composite oxide sintered body. At that time, the raw materials were prepared so as to have compositions in the range of 1 atomic % to 20 atomic % (charged Ca substitution amount).

Example 6 0.05 atomic %
Example 7 1 atomic %
Example 8 2.5 atomic %
Example 9 3.5 atomic %
Example 10 5 atomic %
Example 11 10 atomic %
Example 12 20 atomic %

Yttrium aluminate (YAlO$_3$), which is a typical composition of the YAO-based inorganic dielectric material, has a bandgap energy of 7.9 eV, and even configurations in which a part of Y is substituted with Ca, which is a dopant element, have almost the same bandgap energy.

<Preparation of Powder>

First, as raw materials for the YAO-based composite oxide sintered bodies, the following oxide and carbonate reagents were prepared and weighed so that the Ca substitution amounts were 1 atomic % to 20 atomic %.

Y$_2$O$_3$ 8.211 g to 10.161 g manufactured by FUJIFILM Wako Pure Chemical Corporation Al$_2$O$_3$ 4.635 g manufactured by FUJIFILM Wako Pure Chemical Corporation CaCO$_3$ 0.091 g to 1.820 g manufactured by FUJIFILM Wako Pure Chemical Corporation The weighed reagents were placed in an agate mortar and mixed, and were further classified (<100 μm).

<Producing of Molded Body/Sintered Body>

The powder obtained by classification was placed in an alumina crucible and calcined. As calcination conditions, the temperature was raised to 1100° C. at a temperature rising rate of 2.5° C./min and held at 1100° C. for 10 hours. Further, the temperature was raised to 1350° C. at a temperature rising rate of 2.5° C./min, held at 1350° C. for 10 hours, and then lowered to room temperature at a temperature lowering rate of 2.5° C./min.

The sample after calcining was placed in an agate mortar and crushed, and was further classified (<100 μm) to obtain a molding powder. About 0.5 g of the molding powder was placed in a pellet molding unit having a diameter of ϕ10 mm and pressed at a pressure of 20 MPa for 5 minutes to form a disk-shaped pellet.

The obtained molded pellet was sintered at a temperature higher than the sintering temperature to obtain a sintered pellet made of the YAO-based composite oxide sintered body. As sintering conditions, the temperature was raised to 1600° C. at a temperature rising rate of 2.5° C./min, held at 1600° C. for 2 hours, and then lowered to room temperature at a temperature lowering rate of 2.5° C./min. The diameter of the obtained sintered pellet was about ϕ9.5 mm. The thickness was adjusted to 1 mm by polishing.

Further, as shown in Table 3, the obtained YAO-based composite oxide sintered bodies were subjected to elemental analysis using energy dispersive X-ray analysis (hereinafter, appropriately referred to as EDX), and it was confirmed that the sintered bodies having substantially desired composition could be obtained. Specifically, powders obtained by crushing the sintered bodies in a mortar were used as analysis samples, and constituent elements of the sintered bodies were discriminated from spectrums of characteristic X-rays generated by irradiation with electron beams. As a result, for Examples 6 to 12, almost the same analysis results were obtained with respect to the Ca substitution ratios at the time of raw material preparation (charged Ca substitution amount).

The analysis of the YAO-based composite oxide sintered bodies is not limited to the energy dispersive X-ray analysis, and any method such as the ICP emission spectroscopic analysis method, XPS (X-ray photoelectron spectroscopic analysis) method, and XRF (fluorescent X-ray analysis) method can be adopted. By introducing the dopant element in this way, the substitution amount can be easily controlled and the quantitative evaluation can be easily performed. Note that an error of about ±1% may occur in the composition results by the energy dispersive X-ray analysis.

<Polarization Treatment>

The sintered pellets obtained as described above were subjected to a polarization treatment to obtain electrets 1. A corona discharge was used for the polarization treatment, one side of the disk-shaped pellet was grounded, a corona discharge electrode was placed opposite to the other side, and a negative voltage was applied to generate the corona discharge. The conditions for the corona discharge were as follows. Even when the temperature was lowered, the corona discharge was continued until the temperature reaches room temperature.

Discharge voltage: −5.5 kV
Temperature: 200° C.
Treatment time: 1 min

As a result, the sintered bodies containing Y, Ca, Al, and O were polarized, and the surfaces facing the corona discharge electrode become negatively charged, so that the electrets 1 were formed. At this time, a high surface potential corresponding to the polarization treatment conditions can be obtained, and by performing the polarization treatment at a temperature higher than room temperature (for example, 200° C.), the fluctuation of the surface potential can be easily restricted even in applications where the usage environment is at high temperatures, and stable electret performance can be realized. The temperature and other conditions of the polarization treatment can be appropriately changed according to the characteristics required in the assumed usage environment.

<Surface Potential Measurement>

The surface potential of the electrets 1 (Examples 6 to 9) obtained as described above were measured. For the measurement, the surface potential meter (MODEL341-B: manufactured by Trek Japan Co., Ltd.) was used to measure the surface potentials without contact, and the values just after polarization were read. The results are shown in Table 3.

TABLE 3

| Example | Ca Substitution Amount (atomic %) | Surface Potential (V) |
|---|---|---|
| Example 6 | 0.05 | −908 |
| Example 7 | 1 | −1155 |
| Example 8 | 2.5 | −931 |
| Example 9 | 3.5 | −160 |
| Example 10 | 4.8 | −306 |
| Example 11 | 9.7 | −279 |
| Example 12 | 18.8 | −331 |

As is clear from Table 3, the surface potentials in Examples 6 to 12 in which a part of Y of YAlO$_3$ was substituted with Ca were −160V to −1155V, and high surface potentials were obtained. In particular, in Examples 6 to 8, high surface potentials of about 1000 V were obtained. Further, a surface potential was also measure for an electret 1 using a YAO-based composite oxide sintered body having a Zn substitution amount of 1 atomic % in which a part of Al of YAlO$_3$ is substituted with Zn, and produced and polarized in the same manner as described above. As a result, a value (−1230V) equivalent to the surface potential in the case of Ca substitution was obtained, and it was found that the surface potential does not depend on the dopant type.

From these results, the substitution ratio of the dopant element with respect to the metal elements A and B occupying the A site or B site of the perovskite structure is preferably in the range of 0.05 atomic % to 18.8 atomic %, more preferably in the range of 0.05 atomic % to 2.5 atomic %. Then, by knowing in advance the relationship between the substitution ratio (charged substitution amount) of the dopant element at the time of raw material preparation and the actual substitution amount, an electret 1 having a desired composition and characteristics can be produced.

In this way, the electret 1 having excellent thermal stability, controllable in the amount of crystal defects, and having stable characteristics in the usage environment can be formed.

The present disclosure is not limited to the embodiments described above, and various modifications may be adopted within the scope of the present disclosure without departing from the spirit of the disclosure.

What is claimed is:

1. An electret comprising a composite oxide having an $ABO_3$ type perovskite structure containing two different metal elements A and B, wherein
   the composite oxide is in a polarized state,
   at least a part of one of the metal elements A and B is substituted with a dopant element having a lower valence than the one of the metal elements A and B, and
   the composite oxide has a bandgap energy of 4 eV or more.

2. The electret according to claim 1, wherein
   the metal element A occupying an A site of the perovskite structure is a rare earth element R selected from the group consisting of La, Y, Pr, Sm and Nd, and
   the metal element B occupying a B site is Al.

3. The electret according to claim 1, wherein
   the dopant element that substitutes for the metal element A is an alkaline earth metal element, and
   the dopant element that substitutes for the metal element B is one or more elements selected from the group consisting of alkaline earth metal elements and Zn.

4. The electret according to claim 3, wherein
   the alkaline earth metal element is Ca or Sr.

5. The electret according to claim 3, wherein
   a substitution ratio of the dopant element that substitutes for the metal element A is 20 atomic % or less, and
   the substitution ratio of the dopant element that substitutes for the metal element B is 20 atomic % or less.

6. The electret according to claim 3, wherein
   a substitution ratio of the dopant element that substitutes for the metal element A is 0.05 atomic % to 18.8 atomic %, and
   a substitution ratio of the dopant element that substitutes for the metal element B is 0.05 atomic % to 18.8 atomic %.

7. The electret according to claim 3, wherein
   a substitution ratio of the dopant element that substitutes for the metal element A is 0.05 atomic % to 2.5 atomic %, and
   a substitution ratio of the dopant element that substitutes for the metal element B is 0.05 atomic % to 2.5 atomic %.

* * * * *